US010853030B2

(12) United States Patent
Lin

(10) Patent No.: US 10,853,030 B2
(45) Date of Patent: Dec. 1, 2020

(54) INPUT METHOD AND DEVICE

(71) Applicant: BEIJING SOGOU TECHNOLOGY DEVELOPMENT CO., LTD., Beijing (CN)

(72) Inventor: Changqing Lin, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 15/749,989

(22) PCT Filed: Mar. 22, 2016

(86) PCT No.: PCT/CN2016/077017
§ 371 (c)(1),
(2) Date: Feb. 2, 2018

(87) PCT Pub. No.: WO2017/020593
PCT Pub. Date: Feb. 9, 2017

(65) Prior Publication Data
US 2018/0225087 A1    Aug. 9, 2018

(30) Foreign Application Priority Data

Aug. 4, 2015   (CN) .......................... 2015 1 0472863

(51) Int. Cl.
G06F 3/16         (2006.01)
G06F 3/023        (2006.01)
(Continued)

(52) U.S. Cl.
CPC ............ *G06F 3/167* (2013.01); *G06F 3/0219* (2013.01); *G06F 3/0236* (2013.01);
(Continued)

(58) Field of Classification Search
CPC .... G06F 3/167; G06F 3/0219; G06F 3/04883; G06F 3/04886; G06F 3/04842; G06T 13/80
See application file for complete search history.

(56) References Cited

U.S. PATENT DOCUMENTS 6,712,698 B2 *  3/2004  Paulsen ............... G06F 3/04883
                                                463/16
8,040,233 B2 * 10/2011  Adappa .................. G06Q 30/02
                                                340/517
(Continued)

FOREIGN PATENT DOCUMENTS

CN      102902506 A      1/2013
CN      104216612 A     12/2014
(Continued)

OTHER PUBLICATIONS

Pogue, The Missing iPhone Manual, Aug. 2008, 2nd Edition, p. 24.*
(Continued)

*Primary Examiner* — Matthew Ell
(74) *Attorney, Agent, or Firm* — Anova Law Group, PLLC

(57) ABSTRACT

The present disclosure provides an input method and device. The method specifically comprises: displaying an input interface, where the input interface includes at least one key; in response to a touch operation of a key by a user in an input process, playing an audio corresponding to the key and matching the characteristics of the input interface. Based on keystroke by the user in the input process, the disclosed embodiments provide feedback to the user with animation effect and dynamic audio matching a theme of the current input interface, and enhance key tones in the input process.

15 Claims, 11 Drawing Sheets

(51) Int. Cl.
*G06F 3/0488* (2013.01)
*G06F 3/02* (2006.01)
*G06F 3/0484* (2013.01)
*G06T 13/80* (2011.01)

(52) U.S. Cl.
CPC ...... *G06F 3/04842* (2013.01); *G06F 3/04883* (2013.01); *G06F 3/04886* (2013.01)

(56) References Cited

U.S. PATENT DOCUMENTS

| | | | | |
|---|---|---|---|---|
| 2008/0155425 | A1* | 6/2008 | Murthy | G06F 9/451 715/738 |
| 2010/0241985 | A1* | 9/2010 | Kim | G06F 3/04886 715/773 |
| 2012/0071994 | A1 | 3/2012 | Lengeling | |
| 2014/0181721 | A1* | 6/2014 | Buck | G06F 3/04886 715/773 |
| 2015/0067573 | A1* | 3/2015 | Seo | G06F 3/04886 715/773 |
| 2015/0177922 | A1* | 6/2015 | Poletto | G06F 3/0482 715/753 |

FOREIGN PATENT DOCUMENTS

| | | |
|---|---|---|
| CN | 104298435 A | 1/2015 |
| CN | 104317479 A | 1/2015 |

OTHER PUBLICATIONS

The World Intellectual Property Organization (WIPO) International Search Report for PCT/CN2016/077017 dated Jun. 29, 2016 7 Pages.

* cited by examiner

1501

Displaying an input interface, where the input interface includes at least one key and at least one toolbar icon When the input interface starts or every time the input interface is displayed, outputting an animation effect corresponding to the toolbar icon and matching the characteristics of the input interface

1502

In response to the touch operation of a key by a user in the input process, playing an audio corresponding to the key and matching the characteristics of the input interface

FIG. 15

FIG. 16

INPUT METHOD AND DEVICE

CROSS-REFERENCE TO RELATED APPLICATIONS

This application is a national phase entry under 35 U.S.C § 371 of International Application No. PCT/CN2016/077017 filed on Mar. 22, 2016, which claims the priority of Chinese patent application filed on Aug. 4, 2015 in the Chinese Patent Office with the application number 2015104728633 and entitled "An Input Method and Device", the entire contents of all of which are incorporated herein by reference.

This application claims the priority of Chinese patent application filed on Aug. 4, 2015 in the Chinese Patent Office with the application number 2015104728633 and entitled "An Input Method and Device", the entire contents of all of which are incorporated herein by reference.

FIELD OF THE DISCLOSURE

The present disclosure generally relates to the field of electronic equipment technology and, more particularly, relates to an input method and an input device.

BACKGROUND

Key tones play an important prompting role in the human-machine interaction for electronic devices. Almost all mobile phones, tablet computers, and electronic devices provide the key tone, which is an effective audio-based method for prompting in the user and machine interactions.

When entering texts, a user may type characters through an input method editor keyboard. In absence of the key tone prompting the user, the user may often make mistakes by typing incorrect characters or omitting characters. The input method keys refer to one or more keys for inputting contents and invoking functions. The key tone refers to the sound that is used to prompt the user after the user types a key.

However, the traditional key tone sound may be generated by calling a system function for the key tone sound, which is often pre-configured by electronic device manufacturers. A same key tone sound may be corresponding to any key strokes. As a result, the key tone sound effect corresponding to the user key strokes may be plain and uninteresting, and may be unable to provide desired feedback to the user or customization to the individual user's satisfaction.

BRIEF SUMMARY OF THE DISCLOSURE

In view of the above problems, the embodiments of the present disclosure have been proposed to provide an input method and a corresponding input device that overcome the above problems or at least partially solve the above problems.

To solve the above problems, the embodiments of the present disclosure disclose an input method, comprising:

displaying an input interface, wherein the input interface includes at least one key; and in response to a touch operation of the key by a user in an input process, playing an audio corresponding to the key and matching the characteristics of the input interface.

Another aspect of the present disclosure provides a computer program, comprising computer readable codes, when run by a computer, executing the input method.

Another aspect of the present disclosure provides a computer readable medium, storing the computer program.

Another aspect of the present disclosure provides an input device, comprising:

an interface display module, configured to display an input interface, where the input interface includes at least one key; and an audio playing module, configured to, in response to a touch operation of the key by a user in an input process, play an audio corresponding to the key and matching the characteristics of the input interface.

The embodiments of the present disclosure include the following advantages.

The disclosed embodiments, in response to the touch operation of the key in the input interface by the user in the input process, play the audio corresponding to the key and matching the characteristics of the input interface. Compared to the boring key tones generated by the existing technology, because different keys correspond to different audios in the disclosed embodiments, the user hears different audios when pressing different keys. In addition, the audio corresponding to the key matches the characteristics of the input interface. For example, when the input interface is a blue-and-white porcelain interface, the audio matching the characteristics of the input interface is a melodious audio imitating red koi jumping in and out of water or classical instrument music. Thus, the present disclosure provides the dynamic audio feedback in response to the user keystrokes in the user input process to match the mood and theme of the current input interface, enriches the key tones in the input process, and enhances the user experience and user interactivity in the input process.

BRIEF DESCRIPTION OF THE DRAWINGS

FIG. 15 illustrates a flow chart of the steps in the Embodiment Five of an exemplary input method according to the present disclosure;

FIG. 16 illustrates an animation effect of an exemplary blue-and-white porcelain interface according to the present disclosure;

DETAILED DESCRIPTION

The objectives, features, and advantages of the present disclosure will become clearer from the following description of the embodiments of the present disclosure when taken in conjunction with the accompanying drawings. It should be understood that the specific embodiments described herein are merely illustrative of the present disclosure and are not intended to limit the invention.

Method Embodiment One

Figure 1:
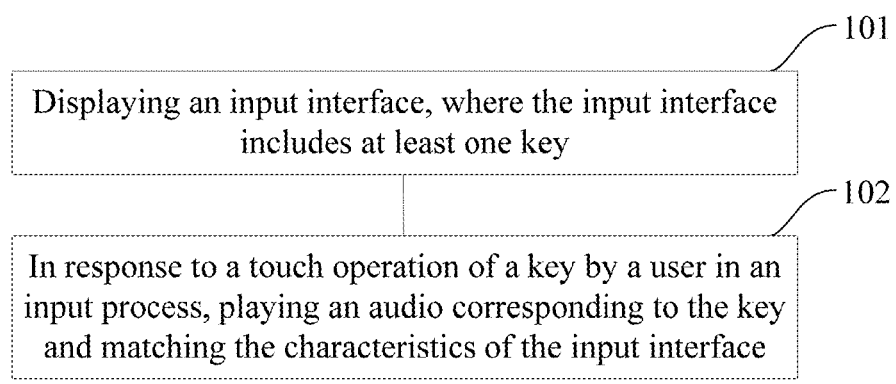
FIG. 1 illustrates a flow chart of the steps in the Embodiment One of an exemplary input method according to the present disclosure.

FIG. 1 illustrates a flow chart of the steps in the Embodiment One of an exemplary input method according to the present disclosure. In particular, the method may include the following steps.

Step 101: displaying an input interface, where the input interface includes at least one key.

Step 102: in response to a touch operation of a key by a user in an input process, playing an audio corresponding to the key and matching the characteristics of the input interface.

In one embodiment, a program implementing the input method may display the input interface. The program implementing the input method may be embedded in any application programs, such as a word processing program, an instant messaging program, and a browser program, etc., and may facilitate the user to input information through the input interface of one of the application programs.

The program implementing the input method may be applied to a mobile phone, a tablet computer, or other electronic device to display the input interface on the electronic equipment, and through the touch screen of the electronic equipment, to capture the touch operation by the user on the input interface. For illustrative purposes, the present disclosure primarily focuses on mobile phones. However, the same method applies to the other electronic equipment.

Specifically, in one embodiment, the touch operations may include a click operation, a long press operation, and a slide operation, etc. The click operation may take a shorter time than a pre-configured time. The long press operation may take a longer time than the pre-configured time. The slide operation may generate a sliding locus line on the touch screen. The touch operations described in the disclosed embodiments are not intended to limit the scope of the present disclosure.

The present disclosure provides the following technical solutions for the input interface and the audio suitable for the characteristics of the input interface.

Technical Solution A1

Specifically, in the technical solution A1, the input interface may be a functional input interface. The audios suitable for the characteristics of the input interface may include the audios that suit the theme of the input interface. Through the audio output that suits the theme of the input interface, the technical solution A1 may immerse the user into the real environment of the functional input interface, thereby providing the user both the visual and auditory satisfaction.

In one embodiment, the functional input interface may specifically be a blue-and-white porcelain interface. The audios corresponding to the theme of the input interface may include classical music instrument related audios matching the blue-and-white porcelain interface.

Figure 2:
FIG. 2 illustrates a schematic diagram of an exemplary blue-and-white porcelain interface according to the present disclosure.

FIG. 2 illustrates a schematic diagram of an exemplary blue-and-white porcelain interface according to the present disclosure. The theme may be about elegantly flowing water. The overall style may look like a light blue Chinese ink painting. The background may be white, surrounded by light blue periphery. Blue flowers, lotus leaves, and red koi may be scattered on the background, the toolbar icons, and the keyboard. The keyboard region may be decorated by translucent water droplets. The texts and symbols on the keys may adopt the analogous color of the keyboard region. It should be understood that the interface shown in FIG. 2 is intended to be illustrative and not to limit the scope of the present disclosure. In practical applications, any interfaces that reflect the blue-and-white porcelain characteristics may be used as the blue-and-white porcelain interface for the present disclosure.

Specifically, as shown in FIG. 2, the blue-and-white porcelain interface may include elements such as blue flowers, lotus leaves, and red koi, etc. The audio matching the blue-and-white porcelain interface shown in FIG. 2 may include melodious audio imitating red koi jumping in and out of water or classical instrument music, which are homogenous with blue flowers, lotus leaves, and red koi, etc. The imitation audio of red koi jumping in and out of water may be substantially similar to the sound that a real red koi jumping in and out of water. The imitation audio may be played by the classical music instruments, which may include one or a combination of guqin, flute, violin/viola/cello/double bass, drum, bamboo flute, and cymbals. It should be understood that the imitation audio of red koi jumping in and out of water is intended to be illustrative, and not to limit the scope of the present disclosure. In practical applications, any imitation audio matching the elegantly flowing water theme of the blue-and-white porcelain interface may be included.

In one embodiment, a first mapping relationship between the keys and the classical music instrument related audios may be pre-configured. Different keys may correspond to different classical music instrument related audios, such that when the touch operation of a key is received, a corresponding classical music instrument related audio may be obtained by looking up the first mapping relationship for the key. Because different keys correspond to different classical music instrument related audios, a user may hear different audios by pressing different keys. Moreover, because the classical music instrument related audios corresponding to the keys match the characteristics of the current input interface, the present disclosure provides the dynamic audio feedback in response to the user keystrokes in the user input process to match the mood and theme of the current input interface.

In practical applications, the classical music instrument audio may specifically include a combination of notational music notes in the form of bass, middle, and treble notes to differentiate the classical music instrument related audios corresponding to different keys. Specifically, the notational music notes may include Dou, Rai, Mi, Fa, Sou, La, and Xi, etc. It should be understood that the ordinary technical person in the art may configure the classical music instrument related audios corresponding to the keys according to practical applications. The specific configuration methods for the classical music instrument related audios and the corresponding keys in the disclosed embodiments are not intended to limit the scope of the present disclosure.

It should be understood that the blue-and-white porcelain interface may be an exemplary functional input interface. In practical applications, the ordinary technical person in the art may use other themes in the functional input interfaces according to the actual needs, including, for example, ethnic style theme interface, anime theme interface, Peking opera theme interface, and mechanical keyboard theme interface, etc. Elements appeared in the ethnic style theme interface, the anime theme interface, the Peking opera theme interface, and the mechanical keyboard theme interface, etc. may be used to match music instrument related audios. For example, the mechanical keyboard theme interface may include keys simulating actual musical instruments. The audios produced by the mechanical keys of the musical instruments (e.g., piano, violin, guzheng, guitar, etc.) may be applied to the touch screen keyboard to provide the user with the experience of hitting the actual mechanical keyboard. The specific functional input interfaces and the corresponding music instrument related audios in the disclosed embodiments are intended to be illustrative and not to limit the scope of the present disclosure.

Technical Solution A2

Specifically, in the technical solution A2, the input interface may be an entertainment input interface. The audios matching the characteristics of the input interface may include the audios that simulate the effects of the actual entertainment input interface corresponding to the entertainment input interface. The audios that simulate the effects of the actual entertainment input interface corresponding to the entertainment input interface may immerse the user into the real environment of the entertainment input interface, thereby providing the user both the visual and auditory satisfaction.

Technical Solution A21

Specifically, in the technical solution A21, the entertainment input interface may be a Mahjong interface, and the audios that simulate the effects of the actual entertainment input interface corresponding to the entertainment input interface may include the audios that simulate the effects of the actual Mahjong interface (hereinafter referred to as Mahjong related audios).

Figure 3:
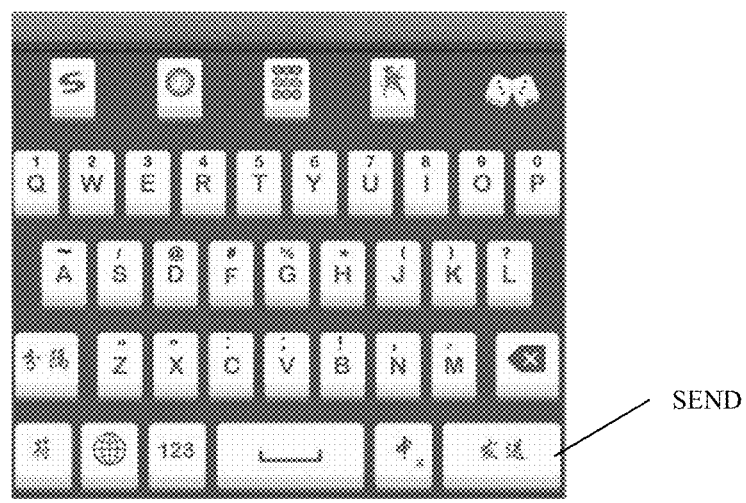
FIG. 3 illustrates a schematic diagram of an exemplary Mahjong interface according to the present disclosure.
Figure 4:
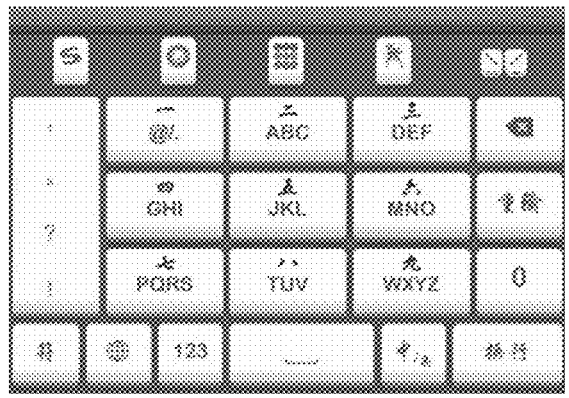
FIG. 4 illustrates a schematic diagram of another exemplary Mahjong interface according to the present disclosure.

FIG. 3 illustrates a schematic diagram of an exemplary Mahjong interface according to the present disclosure. The overall style may include a green background. The toolbar icons and the keys may simulate three-dimensional (3D) images of Mahjong tiles. The bottom surface of the simulated 3D image of the Mahjong tile may be red. The front surface and the side surfaces may be white. The character font may be red, black, or green italics. FIG. 4 illustrates a schematic diagram of another exemplary Mahjong interface according to the present disclosure. The overall style may be similar to that of FIG. 3, with one difference. The style shown in FIG. 4 may be suitable for a nine-grid keyboard while the style shown in FIG. 3 may be suitable for a full keyboard. It should be understood that the Mahjong interfaces shown in FIG. 3 and FIG. 4 are for illustrative purposes. In practical applications, any interfaces that reflect the Mahjong characteristics may be used as the Mahjong interface for the present disclosure. The specific Mahjong interfaces in the disclosed embodiments are not intended to limit the scope of the present disclosure.

In one embodiment, a second mapping relationship between the keys and the Mahjong related audios may be pre-configured. Different keys may correspond to different Mahjong related audios, such that when the touch operation of a key is received, a corresponding Mahjong related audio may be obtained by looking up the second mapping relationship for the key. Because different keys correspond to different Mahjong related audios, a user may hear different audios by pressing different keys. Moreover, because the Mahjong related audios corresponding to the keys match the characteristics of the current input interface, the present disclosure provides the dynamic audio feedback in response to the user keystrokes in the user input process to match the mood and theme of the current input interface.

In practical applications, the Mahjong related audios may specifically include the audios corresponding to Mahjong tile names or Mahjong jargons and other special audios. Specifically, for example, the Mahjong tile names may include dongfeng (east wind), xifeng (west wind), nanfeng (south wind), beifeng (north wind), baiban (white dragon), facai (green dragon), hongzhong (red dragon), and yiwan (one wan), etc., and the Mahjong jargons may include chi (claiming a tile forming a run of three tiles from the same suit), pong (claiming a tile to match a triplet), kong (claiming a tile for a quadruplet), ting (waiting for the one necessary tile to win), and he (claiming a tile to win), etc. In one embodiment, the special audios may include a playful female voice sounded "ah ~~~ ", and "wow~fun~", etc. In one embodiment, the Mahjong related audio corresponding to pressing the key "Q" may be the audio corresponding to yiwan (one wan). The Mahjong related audio corresponding to pressing the space key may be the audio corresponding to hongzhong (red dragon). The Mahjong related audio corresponding to pressing the delete key may be the audio corresponding to chi (claiming a tile forming a run of three tiles from the same suit). The Mahjong related audio corresponding to pressing the globe  key may be a playful female voice sounded "ah ~~~ ".

It should be noted that, to satisfy the listening habits of the users from different regions, the present disclosure provides the Mahjong related audios in multiple dialect versions for the users to select. Specifically, the dialect versions may include Mandarin version, Sichuan version, and Northeastern version, etc. Alternatively, the user region information may be obtained, and the dialect version of the Mahjong related audio matching the user region information may be played accordingly. For example, the region information may be obtained from the personal home page of the user, or from the word history previously entered by the user. The specific methods of obtaining the user region information are intended to be illustrative and not to limit the scope of the present disclosure.

Technical Solution A22

Specifically, in the technical solution A22, the entertainment input interface may be a poker interface, and the audios that simulate the effects of the actual entertainment input interface corresponding to the entertainment input interface may include the audios that simulate the effects of the actual poker interface (hereinafter referred to as poker related audios).

It should be noted that, in the disclosed embodiments, chess-card is a general term for chess and card entertainment activities, which may include traditional or newly popular entertainment activities such as Chinese chess, Go, chess, Mongolian chess, backgammon, checkers, drafts, Jun chess, bridges, poker, and Mahjong, etc. That is, the chess-card interfaces described in the technical solution A21 and the technical solution A22 may be intended to be illustrative. In practical applications, other chess-card interfaces in addition to the Mahjong and poker interfaces may be included. For example, Chinese chess interface and bridges interface are intended to be within the scope of the present disclosure. In addition, because the technical solution A22 has an operation principle similar to the technical solution A21, the description of the operation principle of the technical solution A22 may be referred to the operation principle of the technical solution A21, and will not be repeated herein.

Technical Solution A23

Specifically, in the technical solution A23, the entertainment input interface may be a bubble-film interface, and the audios that simulate the effects of the actual entertainment input interface corresponding to the entertainment input interface may include the audios that simulate the effects of the actual bubble-film interface (hereinafter referred to as bubble-film related audios).

Figure 5:
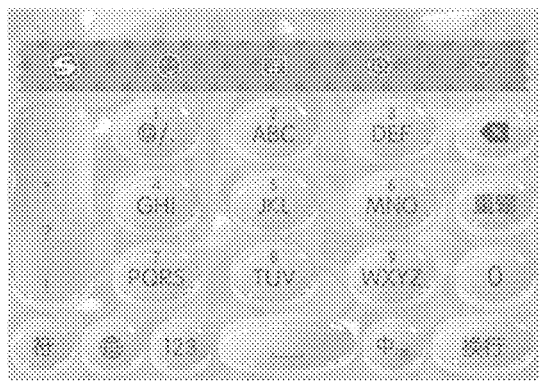
FIG. 5 illustrates a schematic diagram of an exemplary bubble-film interface according to the present disclosure.

FIG. 5 illustrates a schematic diagram of an exemplary bubble-film interface according to the present disclosure. The overall style may include a light blue floral pattern background, pinkish toolbar icons and certain keys. The keys may look like transparent or translucent rounded bubbles. It should be understood that the interface shown in FIG. 5 is intended to be illustrative and not to limit the scope of the present disclosure. In practical applications, any interfaces that reflect the bubble-film characteristics may be used as the bubble-film interface for the present disclosure.

In one embodiment, a third mapping relationship between the keys and the bubble-film related audios may be pre-configured. Different keys may correspond to different bubble-film related audios, such that when the touch operation of a key is received, a corresponding bubble-film related audio may be obtained by looking up the third mapping relationship for the key. Because different keys correspond to different bubble-film related audios, a user may hear different audios by pressing different keys. Moreover, because the bubble-film related audios corresponding to the keys match the characteristics of the current input interface, the present disclosure provides the dynamic audio feedback in response to the user keystrokes in the user input process to match the mood and theme of the current input interface.

In practical applications, the bubble-film related audios may specifically include the audios corresponding to bubble burst audio, burst-resisting bubble-film audio, and other special audios. In one embodiment, the 26 letters from A to Z may be pre-configured to correspond to N number of different bubble burst audios, where N<27. That is, multiple keys may share a same bubble burst audio. Thus, when a letter key is pressed, a corresponding bubble burst audio may be played. In another embodiment, the bubble-film related audio corresponding to a delete key may include a burst-resisting bubble-film audio. In another embodiment, the bubble-film related audio corresponding to a return or linefeed key may include a playful female voice sounded "Wow~Fun~".

In the disclosed embodiments, in response to the touch operation of the key of the input interface by the user in the input process, the audio corresponding to the pressed key and reflecting the characteristics of the input interface may be played. Compared to the boring key tone generated by the existing technology, because different keys correspond to different audios in the present disclosure, the user may hear different audios when pressing different keys. Moreover, the audios corresponding to the keys may match the characteristics of the current input interface. For example, when the input interface is a blue-and-white porcelain interface, the audios matching the characteristics of the current input interface may include the audio imitating red koi jumping in and out of water or the melodious audio played by classical music instrument. Thus, the present disclosure provides the dynamic audio feedback in response to the user keystrokes in the user input process to match the mood and theme of the current input interface, enriches the key tones in the input process, and enhances the user experience and user interactivity in the input process.

In one embodiment, the input process may also include pushing, to the user, an input interface that is coherent to the input environment and/or the user information recorded in the user daily history log according to the input environment and/or the user information recorded in the user daily history log.

Specifically, the input environment may refer to the ambient environment information when the user enters information. In practical applications, the input environment may specifically include one or more of environment characteristics, such as time environment, geographical environment, or application environment, etc. In one embodiment, the input interface coherent to the current input environment may be pushed to the user. For example, when the application environment is a text editing environment or an instant messaging environment, a pleasant input interface such as the blue-and-white porcelain interface may be pushed to the user, or a mechanical keyboard theme interface suitable for the current application environment may be pushed to the user. In another example, when the application environment is a thrilled gaming environment, a passionate input interface such as ethnic style interface may be pushed to the user.

The user information may include user's age, gender, occupation, and other user identity information. The user information may also include user's behavior information, such as regularly using text editor, frequently playing a certain type of games, constantly reading a certain genre of novels, obsessing a certain celebrity, or frequently listening to certain songs. In one embodiment, the input interface that is coherent to the user information may be pushed to the user, thereby personalizing the user experience. For example, an input interface corresponding to level-up games may be pushed to the user who plays level-up games regularly. In another example, the user may be an elderly person, and may often listen to Peking opera. Thus, an input interface corresponding to Peking opera may be pushed to the user.

It should be noted that, in addition to pushing the input interface that is coherent to the input environment and/or the user information to the user, the input process according to the present disclosure may also look up the audio that is coherent to the input environment and/or the user information from the audios matching the characteristics of the input interface based on the input environment and/or the user information.

In addition, the process of pushing the input interface coherent to the input environment and/or the user information to the user may specifically include pushing an address link of the input interface coherent to the input environment and/or the user information to the user, or directly switching the input interface to the input interface coherent to the input environment and/or the user information. The specific process of pushing the input interface coherent to the input environment and/or the user information to the user in the disclosed embodiments is intended to be illustrative and not to limit the scope of the present disclosure.

Method Embodiment Two

The input method according to the present disclosure may further include the following technical solutions on the basis of the first embodiment of the method.

The present disclosure may provide playing the audios corresponding to the key and matching the characteristics of the input interface in the following technical solutions.

Technical Solution B1

Specifically, in the technical solution B1, in response to the touch operation of the key by the user, playing the audio corresponding to the key and matching the characteristics of the input interface may include the following sub-steps.

Sub-step S11: determining a key function corresponding to a key based on input process parameters and/or input environment parameters.

Sub-step S12: playing an audio corresponding to the key and key function and matching characteristics of the input interface.

Under different circumstances, a same key may correspond to different key functions. For example, when a selection is to be made, the key function for a space key may select a screen option. When no selection is to be made, the key function for the space key may enter a space. In another example, when the input environment is web browser, the key function for the SEND key in FIG. 3 may a search function. When the input environment is short message or instant messaging, the key function for the SEND key in FIG. 3 may be a return function.

In view of the above situation, in one embodiment, a fourth mapping relationship between the keys, the key functions, and the audios matching the characteristics of the input interface may be pre-configured. When the touch operation of a key is received, at first, the key function corresponding to the key may be determined based on the input process parameters and/or the input environment parameters. Then, the audio matching the characteristics of the input interface may be looked up in the fourth mapping relationship based on the key and the key function. As can be seen, the technical solution B1 may provide different audios matching the characteristics of the input interface for different key functions of the same key.

For the space key, the input process parameter may be a number of selection options. When the number of the selection options is greater than 0, the key function may select a screen option. When the number of the selection options is 0, the key function may enter a space. For the SEND key in FIG. 3, the input environment parameter may be the current application program environment. It should be understood that, considering the actual needs, the ordinary technical person in the art may determine the key function of the key based on the combination of the input process parameters and the input environment parameters. The determination of the key function of the key in the disclosed embodiments is intended to be illustrative and not to limit the scope of the present disclosure.

Technical Solution B2

Specifically, in the technical solution B2, in response to the touch operation of the key by the user, playing the audio corresponding to the key and matching the characteristics of the input interface may include the following sub-steps.

Sub-step S21: playing the audio corresponding to the key and the touch operation and matching the characteristics of the input interface.

In the technical solution B2, different touch operations of the key may be processed differently to improve the user experience.

In one embodiment, the audio matching the input interface may be configured according to different touch operations (e.g., a click operation, a long press operation, and a slide operation, etc.) of the key, thereby making the key tones more interesting in the input process.

In another embodiment, to avoid interfering the user by the continuous and identical audios, the input method may play the audio for the word "eat" for a click deletion operation because only one character is to be deleted, and may play no audio for a long press deletion operation because all pertaining characters are to be deleted. Thus, the interference to the user by the continuous and identical audio may be avoided.

Technical Solution B3

Specifically, in the technical solution B3, in response to the touch operation of the key by the user, playing the audio corresponding to the key and matching the characteristics of the input interface may include the following sub-steps.

Sub-step S31: in response to the touch operation of the key by the user, determining a key value of the key.

Sub-step S32: when the key value of the key is a consonant, playing the audio corresponding to the key and matching the characteristics of the input interface.

Considering that the vowels such as "A", "E", "I", "O", and "U" have fast input speed and high input frequency and the consonants such as "B", "C", and "D" have slow input speed and low input frequency, to avoid the interference to the user by the fast repeating audios, the technical solution B3 may only play the corresponding audio when the consonant keys are pressed and play no audio when the vowel keys are pressed.

The technical solutions for playing the audios corresponding to the key and matching the characteristics of the input interface have been described in detail. In should be understood that the ordinary technical person in the art may, based on the actual needs, use one or a combination of the technical solutions. Alternatively, other technical solutions may be adopted. For example, the mapping relationship between the key and the audio matching the characteristics of the input interface may be one-to-one or many-to-one. The specific technical solutions for playing the audio corresponding to the key and matching the characteristics of the input interface in the disclosed embodiments are intended to be illustrative and not to limit the scope of the present disclosure.

Method Embodiment Three

Figure 6:
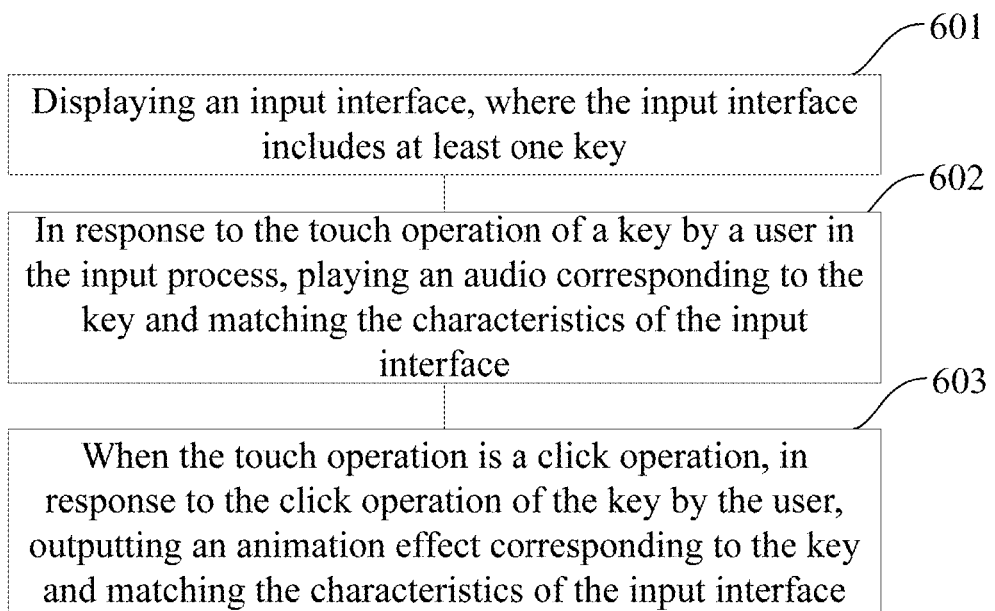
FIG. 6 illustrates a flow chart of the steps in the Embodiment Three of an exemplary input method according to the present disclosure.

FIG. 6 illustrates a flow chart of the steps in the Embodiment Three of an exemplary input method according to the present disclosure. Specifically, the method may include the following steps.

Step 601: displaying an input interface, which includes at least one key.

Step 602: in response to the touch operation of a key by a user in the input process, playing an audio corresponding to the key and matching the characteristics of the input interface.

Step 603: when the touch operation is a click operation, in response to the click operation of the key by the user, outputting an animation effect corresponding to the key and matching the characteristics of the input interface.

Compared to the method in the first embodiment, the disclosed embodiment may, in response to the click operation of the key by the user, output an animation effect corresponding to the key and matching the characteristics of the input interface, thereby improving the visual experience in the input process.

Figure 7:
FIG. 7 illustrates a pop-up effect of an exemplary Mahjong interface according to the present disclosure.

In one embodiment, the animation effect matching the characteristics of the input interface may include a pop-up effect matching the characteristics of the chess-card interface. For example, FIG. 7 illustrates a pop-up effect of an exemplary Mahjong interface according to the present disclosure. When the key "G" is clicked, the pop-up effect may be outputted. The pop-up effect may look like picking a Mahjong tile. Thus, the visual experience may be improved in the input process.

Figure 8:
FIG. 8 illustrates a bubble-burst effect of an exemplary bubble-film interface according to the present disclosure.

In another embodiment, the animation effect matching the characteristics of the input interface may include a bubble-burst effect matching the bubble-film interface. For example, FIG. 8 illustrates a bubble-burst effect of an exemplary bubble-film interface according to the present disclosure. When the key "G" is clicked, the bubble-burst effect may be outputted. The bubble-burst effect may look like a bubble bursting effect. Thus, the visual experience may be improved in the input process.

It should be noted that, for the Mahjong interface of a full keyboard, the pop-up effect may be outputted, and for the bubble-film interface of either a full keyboard or a nine-grid keyboard, the bubble-burst effect may be outputted.

It should be understood that the pop-up effect matching the characteristics of the chess-card interface and the bubble-burst effect matching the characteristics of the bubble-film interface are merely embodiments of the animation effect matching the input interface according to the present disclosure, and are not intended to limit the scope of the animation effect matching the input interface. In practical applications, any animation effects matching the input interface may be feasible, for example, a hitting effect matching the billiard ball interface. The specific animation effects matching the characteristics of the input interface in the disclosed embodiments are intended to be illustrative and not to limit the scope of the present disclosure.

It should be noted that the step 603 may be executed after the step 602 is completed or at the same time the step 602 is executed. The execution order of the step 603 and step 602 is not intended to limit the scope of the present disclosure.

Method Embodiment Four

Figure 9:
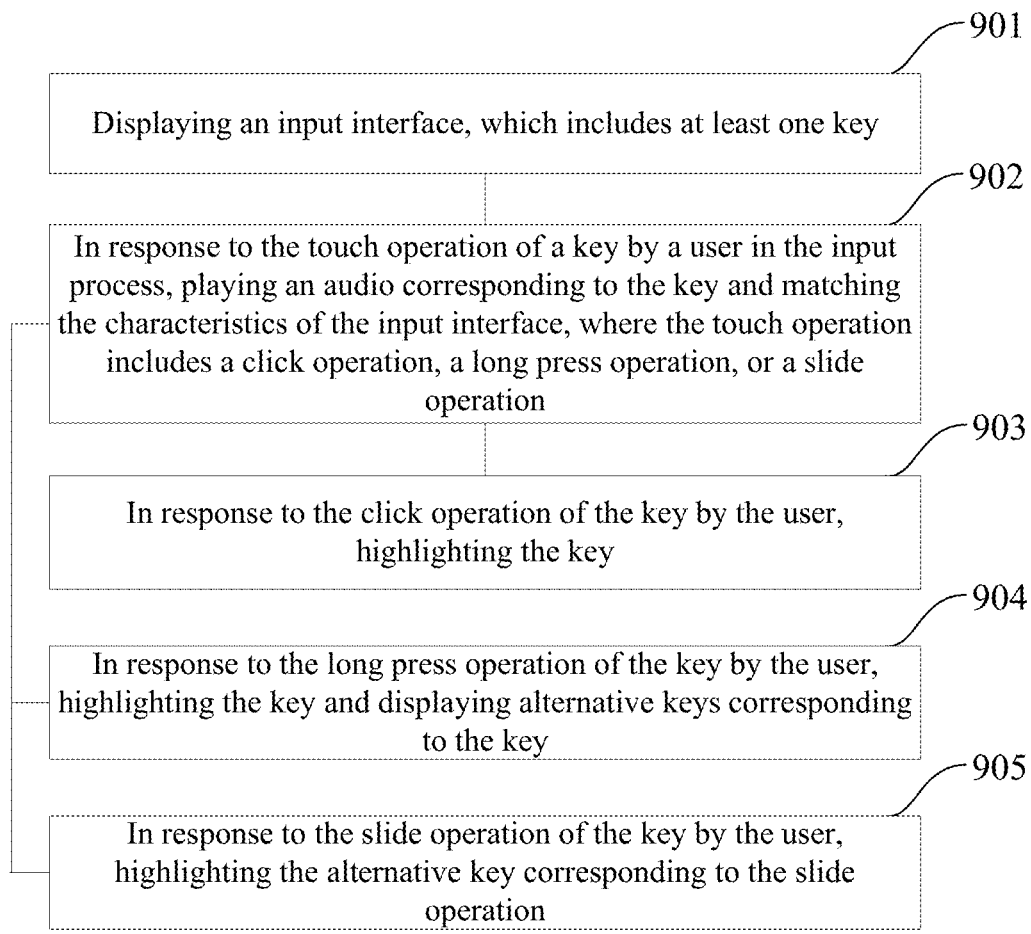
FIG. 9 illustrates a flow chart of the steps in the Embodiment Four of an exemplary input method according to the present disclosure.

FIG. 9 illustrates a flow chart of the steps in the Embodiment Four of an exemplary input method according to the present disclosure. Specifically, the method may include the following steps.

Step 901: displaying an input interface, which includes at least one key.

Step 902: in response to the touch operation of a key by a user in the input process, playing an audio corresponding to the key and matching the characteristics of the input interface, where the touch operation includes a click operation, a long press operation, or a slide operation.

Step 903: in response to the click operation of the key by the user, highlighting the key; or Step 904, in response to the long press operation of the key by the user, highlighting the key and displaying alternative keys corresponding to the key; or Step 905: in response to the slide operation of the key by the user, highlighting the alternative key corresponding to the slide operation.

Compared to Method Embodiment One, in response to the click operation, the long press operation, or the slide operation of the key by the user, the input interface in this embodiment may display a corresponding result. Thus, the visual experience in the input process may be improved.

Figure 10:
FIG. 10 illustrates a schematic diagram of an exemplary key highlighted interface according to the present disclosure.

In the disclosed embodiment, in response to the click operation of the key by the user, the key may be highlighted. The highlighting may include highlighting the periphery of the key, turning the key transparent, or deepening the key color, etc. For example, when a key in FIG. 3 is clicked, the periphery of the key may turn into green. In another example, when a key in FIG. 2 is clicked, the key may turn into transparent blue. In another example, FIG. 10 illustrates a schematic diagram of an exemplary key highlighted interface according to the present disclosure. Referring to FIG. 10, when the RE-ENTER key is clicked, the key color may be deepened.

In the disclosed embodiment, in response to the long press operation of the key by the user, the key may be highlighted and the alternative keys corresponding to the pressed key may be displayed. The alternative keys corresponding to the pressed key may be the keys corresponding to the alternative characters selected by the pressed key.

Figure 11:
FIG. 11, FIG. 12, and FIG. 13 illustrate various schematic diagrams of exemplary long press operation interfaces according to the present disclosure.
Figure 12:
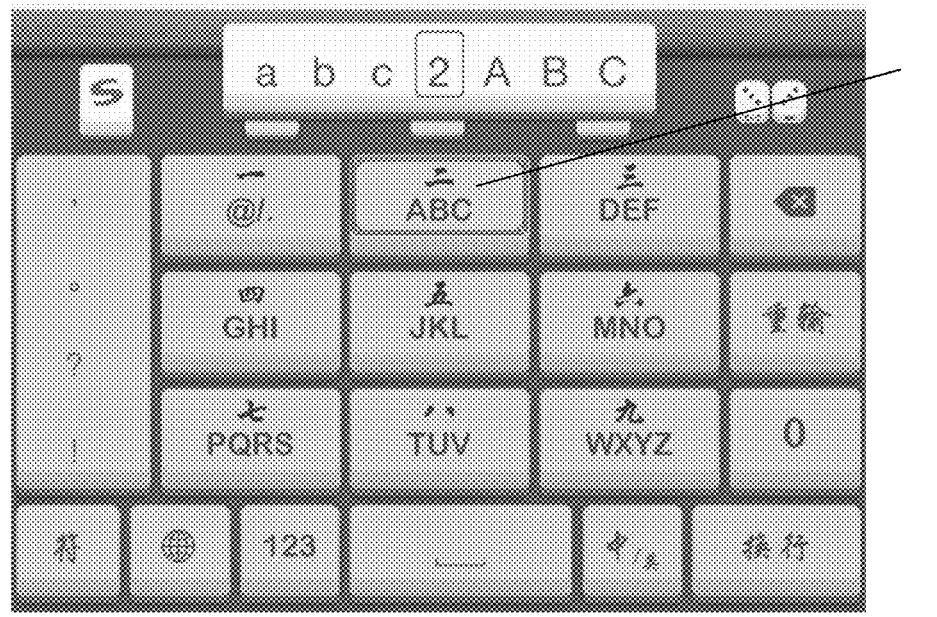
Figure 13:
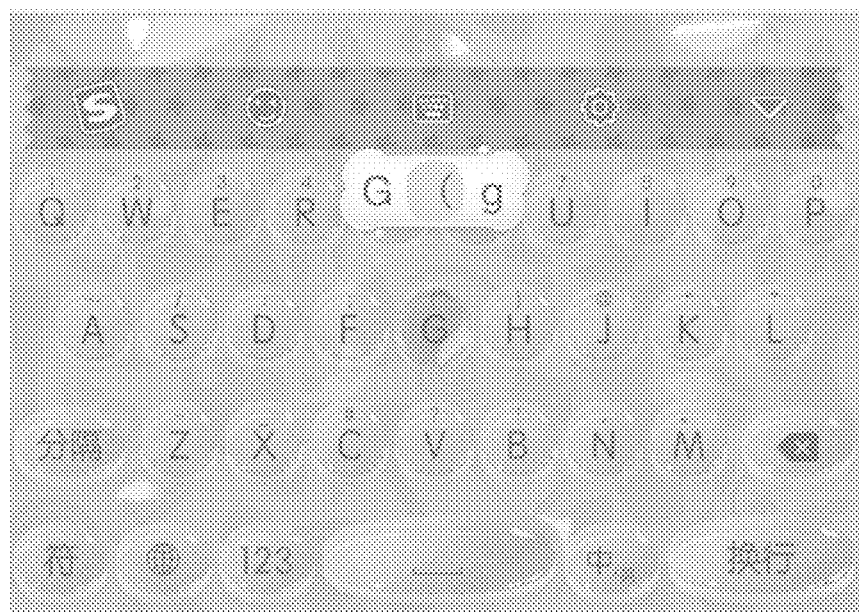

FIG. 11, FIG. 12, and FIG. 13 illustrate various schematic diagrams of exemplary long press operation interfaces according to the present disclosure.

In FIG. 11, when the key "5" is long pressed, an alternative interface may be displayed above the pressed key. A red koi may appear in the upper right corner of the alternative interface. The alternatives keys in the alternative interface may include "j", "k", "1", "5", "J", "K", and "L". One (e.g., the alternative key "5" in the middle position) of the alternative keys in the alternative interface may be highlighted by a transparent blue color box. The transparent blue color box may move in response to the horizontal slide operation.

In FIG. 12, when the key "2" is long pressed, a green frame may appear in the periphery of the pressed key and an alternative interface may appear above the pressed key. The alternative interface may simulate the 3D images of the Mahjong tiles. The bottom surface of the simulated 3D images of the Mahjong tiles may be green. The front and side surfaces may be white. The characters may be in red, black, or green italics. The alternative keys in the alternative interface may include "a", "b", "c", "2", "A", "B", and "C". One (e.g., the alternative key "2" in the middle position) of the alternative keys in the alternative interface may be highlighted by a green frame. The green frame may move in response to the horizontal slide operation.

In FIG. 13, when the key "G" is long pressed, the color of the pressed key may be deepened and an alternative interface may appear above the pressed key. The alternative interface may look like a transparent or translucent rounded bubble. The alternative keys in the alternative interface may include "G", "(", and "g". One (e.g., the alternative key "(" in the middle position) of the alternative keys in the alternative interface may be highlighted by a pink bubble. The pink bubble may move in response to the horizontal slide operation.

Figure 14:
FIG. 14 illustrates a schematic diagram of an exemplary slide operation interface according to the present disclosure.

In the disclosed embodiment, in response to the slide operation of the key by the user, the alternative key corresponding to the slide operation may be highlighted. Assuming that other characters are displayed in the upper or lower portion of the pressed key, when the slide operation is downward, the alternative key corresponding to the slide operation may include the character in the lower portion of the key. When the slide operation is upward, the alternative key corresponding to the slide operation may include the character in the upper portion of the key. For example, FIG. 14 illustrates a schematic diagram of an exemplary slide operation interface according to the present disclosure. After an upward slide operation of the key "G" is performed, the "(" character in the upper portion of the key may appear in a bubble above the key.

Method Embodiment Five

FIG. 15 illustrates a flow chart of the steps in the Embodiment Five of an exemplary input method according to the present disclosure. Specifically, the method may include the following steps.

Step 1501: displaying an input interface, where the input interface includes at least one key and at least one toolbar icon.

Step 1502: in response to the touch operation of a key by a user in the input process, playing an audio corresponding to the key and matching the characteristics of the input interface.

Specifically, the step 1501 may include:

Step 1511: when the input interface starts or every time the input interface is displayed, outputting an animation effect corresponding to the toolbar icon and matching the characteristics of the input interface.

Compared to the first embodiment of the method, the input interface in the disclosed embodiment may also include at least one toolbar icon. The toolbar icon may be used to quickly provide functions, such as setting of the input method program, setting of the input interface, and inputting emoticons, etc. And when the input interface starts or every time the input interface is displayed, the animation effect corresponding to the toolbar icon and matching the characteristics of the input interface may be outputted. Thus, the visual experience in the input process may be improved.

The present disclosure provides the technical solutions for outputting the animation effects corresponding to the toolbar icon and matching the characteristics of the input interface.

Technical Solution C1

Specifically, in the technical solution C1, the input interface may include a blue-and-white porcelain interface, and the animation effect matching the characteristics of the input interface may specifically include an effect of an object roaming to a toolbar icon in the blue-and-white porcelain interface.

FIG. 16 illustrates an animation effect of an exemplary blue-and-white porcelain interface according to the present disclosure. Referring to FIG. 16, every time the blue-and-white porcelain interface is displayed (including starting the blue-and-white porcelain interface and re-starting the blue-and-white porcelain interface after each termination of the blue-and-white porcelain interface), a red koi may appear in the upper left corner of the toolbar icon in a lotus leave shape. The red koi may roam to the bottom of the lotus leave until it disappears.

Technical Solution C2

Specifically, in the technical solution C2, the input interface may include a Mahjong interface, and the toolbar icon may be a Mahjong tile. Then, the animation effect matching the characteristics of the input interface may specifically include a moving effect of the Mahjong tile.

Taking the Mahjong interface shown in FIG. 3 as an example, each time the Mahjong interface starts (including each time the Mahjong interface starts and each time the Mahjong interface starts after being switched from a different input interface), after the five toolbar icons pop up and drop down, a spinning collision of two dices of the rightmost toolbar icons may be outputted. It should be understood that the moving effect of the Mahjong tiles in the disclosed embodiment is intended to be illustrative and not to limit the scope of the present disclosure.

Technical Solution C3

Specifically, in the technical solution C3, the input interface may include a poker interface, and the toolbar icon may be a poker icon. Then, the animation effect matching the characteristics of the input interface may specifically include a moving effect of the poker icon. Because the technical solution C3 has an operation principle similar to the technical solution C2, the description may be referred and not be repeated herein.

Technical Solution C4

Specifically, in the technical solution C4, the input interface may include a bubble-film interface, and then the animation effect matching the characteristics of the input interface may specifically include a roll-up extension effect of the toolbar icon.

Figure 17:
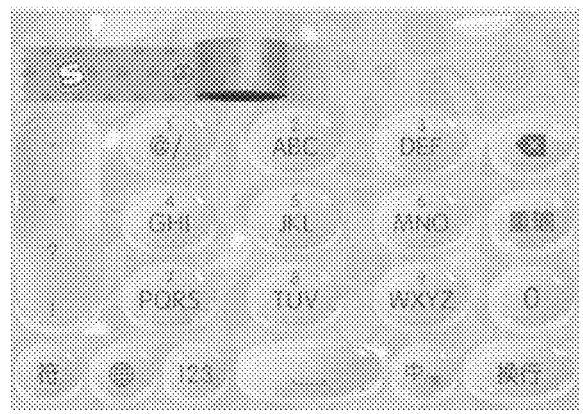
FIG. 17 illustrates an animation effect of an exemplary bubble-film interface according to the present disclosure.

FIG. 17 illustrates an animation effect of an exemplary bubble-film interface according to the present disclosure. Each time the bubble-film interface starts (including each time the input method program starts or the bubble-film interface starts after being switched from other input interface), the pink toolbar may be stretched out after being rolled up.

In one embodiment, the method may further include, in response to the click operation on the toolbar icon by the user, outputting a gradual color change effect or a color change effect of the toolbar icon, or an alternating display effect between sub-icons corresponding to the toolbar icon and other toolbar icons in the input interface.

Figure 18:
FIG. 18 illustrates a gradual color change effect of keyboard icons of an exemplary blue-and-white porcelain interface according to the present disclosure.

Taking the blue-and-white porcelain interface shown in FIG. 2 as an example, when the keyboard icon is clicked, a water-ripple effect may appear covering the keyboard icon. The color of the water-ripple effect may change from heavy to light, and may expand until it disappears. FIG. 18 illustrates a gradual color change effect of keyboard icons of an exemplary blue-and-white porcelain interface according to the present disclosure.

Taking the Mahjong interface shown in FIG. 3 as an example, when any one of the first, the third, the fourth and the fifth toolbar icons from the left is clicked, the green background of the corresponding toolbar icon may gradually fade, and after the toolbar icon is released, a green frame may appear at the periphery of the clicked toolbar icon. When the second toolbar icon (sunflower emoticon) from the left is clicked, the first, the third and the fourth toolbar icon may disappear, and another three Mahjong tile emoticons may appear rotating out of the sunflower emoticon and replacing the first, the third and the fourth toolbar icons from the left. When the sunflower emoticon is clicked again, the other three emoticons may disappear rotating back into the sunflower emoticon, and the first, the third and the fourth toolbar icons may re-appear.

Taking the bubble-film interface shown in FIG. 5 as an example, when one of the toolbar icons is clicked, the background color of the toolbar icons may change from pink to yellow.

It should be understood that, the display effects after the toolbar icon is clicked are intended to be illustrative. In practical applications, based on the characteristics of the input interface, the ordinary technical person in the art may modify to output other display effects after the toolbar icon is clicked. In the disclosed embodiments, the specific display effects after the toolbar icon is clicked are not limited by the present disclosure.

Method Embodiment Six

Figure 19:
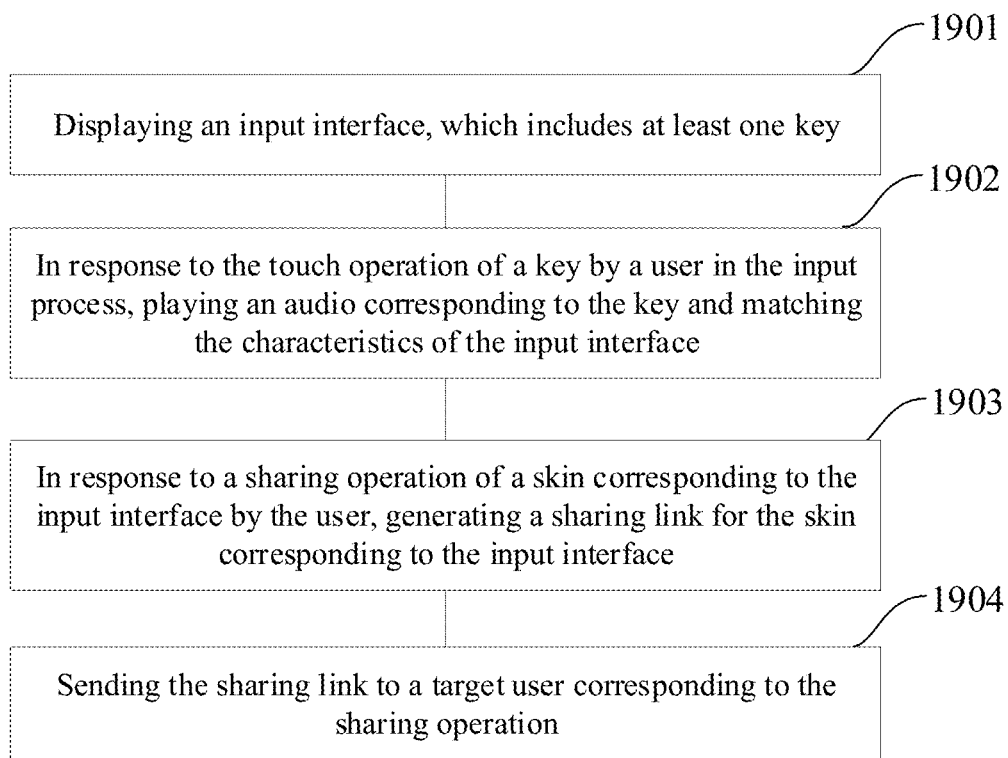
FIG. 19 illustrates a flow chart of the steps in the Embodiment Six of an exemplary input method according to the present disclosure.

FIG. 19 illustrates a flow chart of the steps in the Embodiment Six of an exemplary input method according to the present disclosure. Specifically, the method may include the following steps.

Step 1901: displaying an input interface, which includes at least one key.

Step 1902: in response to the touch operation of a key by a user in the input process, playing an audio corresponding to the key and matching the characteristics of the input interface.

Step 1903: in response to a sharing operation of a skin corresponding to the input interface by the user, generating a sharing link for the skin corresponding to the input interface.

Step 1904: sending the sharing link to a target user corresponding to the sharing operation.

Compared to the first embodiment of the method, the disclosed embodiment may further share the skin corresponding to the input interface to the target user to increase the exposure of the skin. Thus, the utilization rate of the input method program corresponding to the skin may be increased.

In practical applications, the input method program may be launched on an electronic device to enter the skin interface of the input method program. The skin to be shared may be clicked. Various social application programs, such as WeChat, QQ, and Weibo, etc., may appear below the clicked skin. After a target social application program and a corresponding target user (e.g., a friend or a group of friends) are selected, the sharing operation of the skin corresponding to the input interface may be considered to be sent by the user. The sharing operation may include the sharing information, such as the target social application program, the target skin (e.g., the skin corresponding to the blue-and-white porcelain interface), and the target user, etc. Then, a sharing link of the target skin may be generated from the sharing information. The sharing link may include a link address of the target skin, such that the target user may enable the corresponding target skin based on the link address.

Assuming that the target social application program is WeChat, the process of sending the sharing link to the target user corresponding to the sharing operation may specifically include running the application program and entering the WeChat chat interface, selecting a WeChat friend or a chat group or a circle of friends, and sending the sharing link to the friend(s). In the target application, the sharing link may be clicked to open the page of the target skin. Under the circumstance that the input method program corresponding to the target skin is installed and the installed version meets the requirements, the launch control on the page of the target skin may be clicked to enjoy the experience of the target skin. It should be understood that the specific process of generating the sharing link and sending the sharing link in the disclosed embodiments is intended to be illustrative and not to limit the scope of the present disclosure.

It should be noted that, for simplifying the description of the disclosed embodiments, the method is described in a series of action combinations. However, the ordinary technical person in the art should know that the present disclosure is not limited by the described action sequences, because certain steps may be executed in different sequences or executed concurrently. Further, the ordinary technical person in the art should know that the embodiments disclosed in the specification are preferred embodiments, and certain actions involved are not necessarily essential to the embodiments of the present disclosure.

Device Embodiment One

Figure 20:
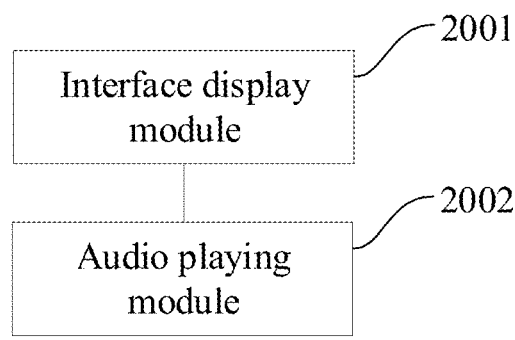
FIG. 20 illustrates a schematic diagram of the Embodiment One of an exemplary input device according to the present disclosure.

FIG. 20 illustrates a schematic diagram of the Embodiment One of an exemplary input device according to the present disclosure. Specifically, the device may include the following modules.

Interface display module 2001, configured to display an input interface, where the input interface may include at least one key; and Audio playing module 2002, configured to play an audio corresponding to the key and matching the characteristics of the input interface in response to the touch operation of the key by the user in the input process.

Specifically, in one embodiment, the input interface may include an entertainment input interface, and the audio matching the characteristics of the input interface may include an audio that simulates the input effect of the actual entertainment input interface corresponding to the entertainment input interface; or Specifically, in another embodiment, the functional input interface may include a blue-and-white interface, and the audio matching the theme characteristics of the input interface may specifically include the related audio of classical music instrument matching the elements in the blue-and-white porcelain interface; or Specifically, the entertainment input interface may include a Mahjong interface, and the audio that simulates the input effect of the actual entertainment input interface corresponding to the entertainment input interface may include the audio that simulates the input effect of the actual Mahjong interface; or Specifically, the entertainment input interface may include a poker interface, and the audio that simulates the input effect of the actual entertainment input interface corresponding to the entertainment input interface may include the audio that simulates the input effect of the actual poker interface; or Specifically, the entertainment input interface may include a bubble-film interface, and the audio that simulates the input effect of the actual entertainment input interface corresponding to the entertainment input interface may include the audio that simulates the input effect of the actual bubble-film interface.

Specifically, in another embodiment, the audio playing module 2002 may include:

a first determination sub-module, configured to determine a key function corresponding to the key based on input process parameters and/or input environment parameters; and a first playing sub-module, configured to play the audio corresponding to the key and the key function and matching the characteristics of the input interface.

Specifically, in another embodiment, the audio playing module 2002 may include:

a second playing sub-module, configured to play the audio corresponding to the key and the touch operation and matching the characteristics of the input interface.

Specifically, in another embodiment, the audio playing module 2002 may include:

a second determination sub-module, configured to determine a key value corresponding to the key in response to the touch operation of the key by the user; and a third playing sub-module, configured to, when the key value is consonant, play the audio corresponding to the key and matching the characteristics of the input interface.

Specifically, in another embodiment, the device may further include:

a generation module, configured to, in response to a sharing operation of a skin corresponding to the input interface by the user, generate a sharing link of the skin corresponding to the input interface; and a sending module, configured to send the sharing link to a target user corresponding to the sharing operation.

Specifically, in another embodiment, the device may further include:

a push module, configured to, based on the input environment and/or the user information recorded in the user log, push to the user an input interface matching the input environment and/or the user information.

Device Embodiment Two

Figure 21:
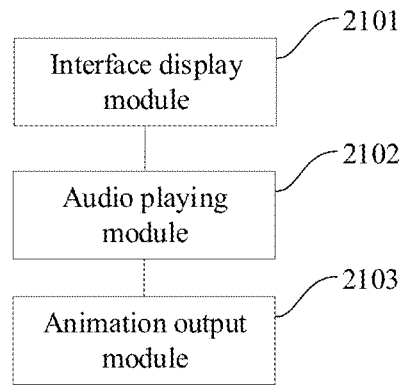
FIG. 21 illustrates a schematic diagram of the Embodiment Two of an exemplary input device according to the present disclosure.

FIG. 21 illustrates a schematic diagram of the Embodiment Two of an exemplary input device according to the present disclosure. Specifically, the device may include the following modules:

an interface display module 2101, configured to display the input interface, where the input interface may specifically include at least one key;

an audio playing module 2102, configured to, in response to the touch operation of the key by the user in the input process, play an audio corresponding to the key and matching the characteristics of the input interface, where the touch operation may include a click operation; and an animation output module 2103, configured to, in response to the click operation of the key by the user, output an animation effect corresponding to the key and matching the characteristics of the input interface.

Device Embodiment Three

Figure 22:
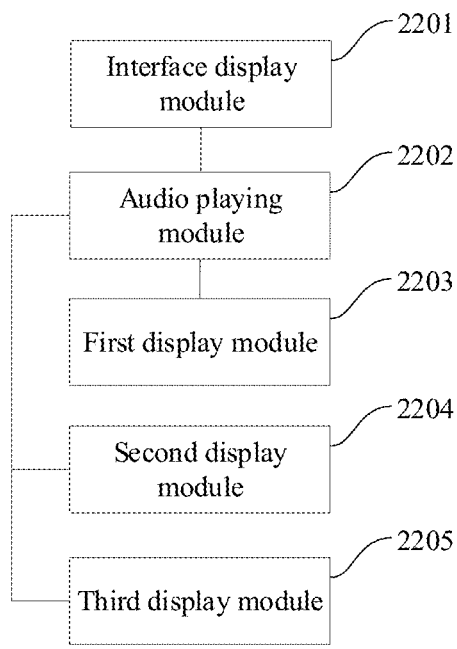
FIG. 22 illustrates a schematic diagram of the Embodiment Three of an exemplary input device according to the present disclosure.

FIG. 22 illustrates a schematic diagram of the Embodiment Three of an exemplary input device according to the present disclosure. Specifically, the device may include the following modules:

an interface display module 2201, configured to display the input interface, where the input interface may specifically include at least one key;

an audio playing module 2202, configured to, in response to the touch operation of the key by the user in the input process, play an audio corresponding to the key and matching the characteristics of the input interface, where the touch operation may include a click operation, a long press operation, or a slide operation; and a first display module 2203, configured to, in response to the click operation of the key by the user, highlight the key; or a second display module 2204, configured to, in response to the long press operation of the key by the user, highlight the key and display alternative keys corresponding to the pressed key; or a third display module 2205, configured to, in response to the slide operation of the key by the user, highlight an alternative key corresponding to the slide operation.

Device Embodiment Four

Figure 23:
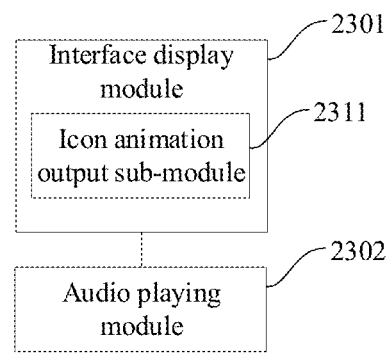
FIG. 23 illustrates a schematic diagram of the Embodiment Four of an exemplary input device according to the present disclosure.

FIG. 23 illustrates a schematic diagram of the Embodiment Four of an exemplary input device according to the present disclosure. Specifically, the device may include the following modules:

an interface display module 2301, configured to display the input interface, where the input interface may specifically include at least one key and at least one toolbar icon;

an audio playing module 2302, configured to, in response to the touch operation of the key by the user in the input process, play an audio corresponding to the key and matching the characteristics of the input interface.

Specifically, the interface display module 2301 may include:

an icon animation output sub-module 2311, configured to, when the input interface starts or every time the input interface is displayed, output an animation effect corresponding to the toolbar icon and matching the characteristics of the input interface.

In one embodiment, the device may further include:

an icon display module, configured to, in response to the click operation of the toolbar icon by the user, output a gradual color change effect or a color change effect of the toolbar icon, or an alternating display effect between sub-icons corresponding to the toolbar icon and other toolbar icons in the input interface.

Because the embodiments of the device are similar to the embodiments of the method, the description of the embodiments of the device is streamlined and may be referred to the certain description of the embodiments of the method.

The various components of the disclosed embodiments may be implemented by hardware, or by one or more software modules executed by a processor, or by a combination of both. The ordinary technical person in the art should understand that, in practical applications, a microprocessor or a digital signal processor (DSP) may be used to implement certain portions or all of the functions of certain or all components of the client-end or the server in the disclosed embodiments. The present disclosure further provides certain or all devices or device programs (e.g., computer programs and computer program products) for implementing the described method. The programs implementing the disclosed embodiments may be stored on a computer readable medium or in the form of one or more signals. Such signals may be downloaded from Internet websites, provided through carrier signals, or provided in any other forms.

Figure 24:
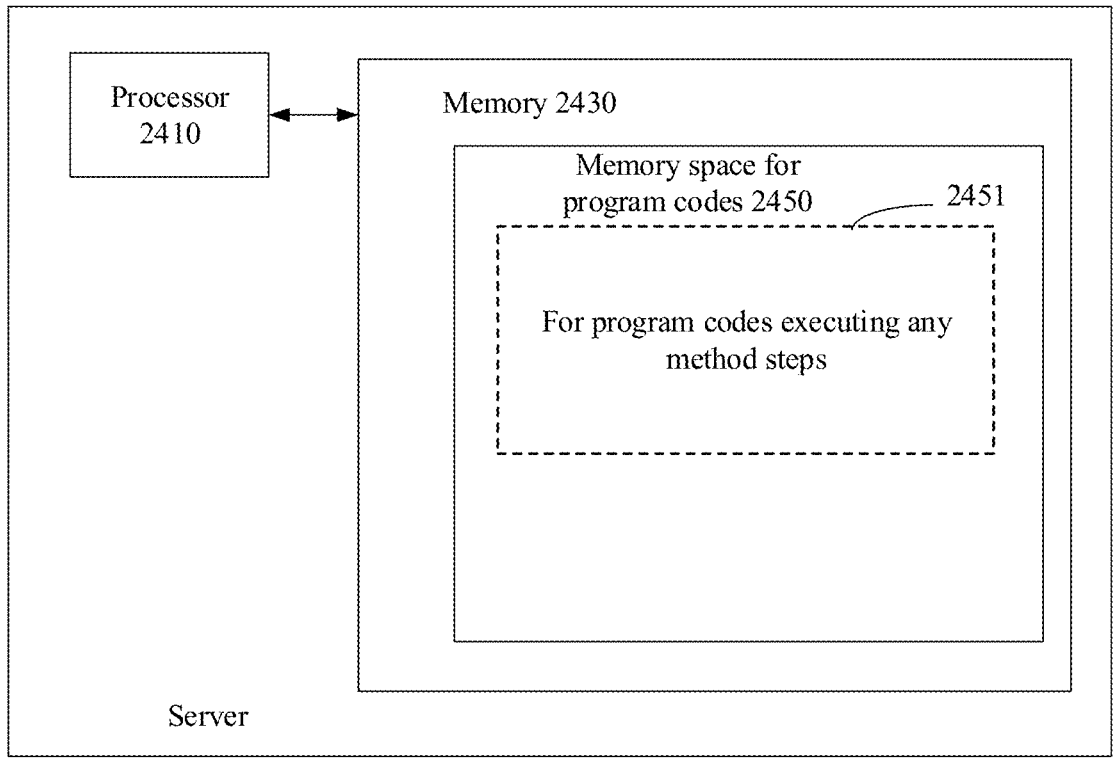
FIG. 24 illustrates a schematic diagram of an exemplary server for implementing an exemplary input method according to the present disclosure.
Figure 25:
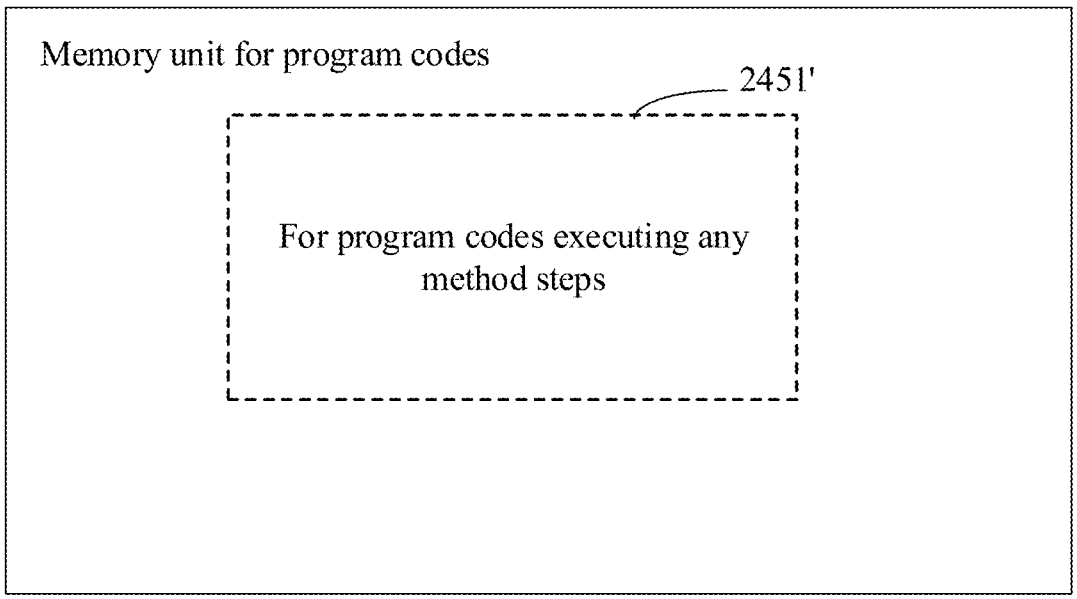
FIG. 25 illustrates a schematic diagram of an exemplary memory unit for storing or holding program code implementing an exemplary input method according to the present disclosure.

FIG. 24 illustrates a schematic diagram of an exemplary server for implementing an exemplary input method according to the present disclosure. For example, the server may be a search engine server. Traditionally, the server may include a processor 2410 and a plurality of computer programs in the form of memory 2430 or computer readable media. The memory 2430 may include electronic memories, such as flash memory, electrically erasable programmable read-only memory (EEPROM), electrically programmable read-only memory (EPROM), hard disk, or read-only memory (ROM), etc. The memory 2430 may include a memory space 2450 for program codes executing any method steps 2451 in the disclosed embodiments. For example, the memory space 2450 for program codes may store respective program codes 2451 executing the method steps. The program codes may be read from one or more computer program products or be written into one or more computer program products. The computer program products may include program code carriers such as hard disk, compact disk (CD), memory card, or floppy disk, etc. The computer program products may often be a portable or fixed memory unit as shown in FIG. 24. The memory unit may include memory sections or memory space similar to the memory 2430 of the server shown in FIG. 24. The program codes may be compressed, for example, in a suitable form. Generally, the memory unit may include computer readable codes 2451', that is, the codes that can be read by a processor, such as the processor 2410. When run by the server, the codes may allow the server to execute individual method steps in the disclosed embodiments.

References to "one embodiment", "an embodiment", or "one or more embodiments" means that a particular feature, structure, or characteristic described in the disclosed embodiments is included in at least one embodiment of the present disclosure. In addition, it should be noted that the phrase "in one embodiment" does not necessarily refer to the same embodiment.

The specification provided herein sets forth numerous specific details. However, it should be understood that, the disclosed embodiments may be implemented without these specific details. In certain instances, well-known methods, structures, and techniques have not been shown in detail for the purpose of unobscure understanding of the specification.

It should be noted that the disclosed embodiments are intended to illustrative and not to limit the scope of the present disclosure. The ordinary technical person in the art may design various other substitutions without departing from the scope of the appended claims. In the claims, any reference symbols placed between parentheses shall not be construed as limiting the claims. The word "comprising" does not exclude the presence of elements or steps not listed in the claims. The words "a" or "an" preceding an element does not exclude the presence of a plurality of such elements. The present disclosure may be implemented by hardware comprising a plurality of different elements and by a properly programmed computer. In the claims listing a plurality of components of the device, the plurality of the components of the device may be implemented by a same hardware. The use of the words "first", "second", and "third", etc. do not denote any order. These words may be interpreted as names.

In addition, it should be noted that the language used in the specification is chosen primarily for readability and illustration purposes, and not for the purpose of explaining or defining the subject matter of the present disclosure. Thus, without departing from the scope and the spirit of the claims, the ordinary technical person in the art may make various other obvious changes, rearrangements, and substitutions. For the scope of the present disclosure, the disclosure made herein is intended to be illustrative and not restrictive. The scope of the present disclosure is determined by the appended claims.

What is claimed is:

1. An input method, comprising:
recognizing a program environment upon detecting a user input according to an environment relationship map stored in a memory of a user device, the environment relationship map including a text editing environment, an instant messaging environment, and a gaming environment correlating to different user inputs via different input methods, wherein the different input methods are respectively embedded in the text editing environment, the instant messaging environment, and the gaming environment, and wherein the different input methods are respectively triggered upon capturing a touch operation on the user device;
displaying an input interface with a theme keyboard specific to the program environment as recognized according to keyboard theme maps stored in the memory of the user device, the keyboard theme maps including first, second, and third keyboard theme maps, wherein the input interface includes first keys, second keys, or third keys, and wherein the first keyboard theme map correlates the first keys with music theme audios, the second keyboard theme map correlates the second keys with gaming theme audios, and the third keyboard theme map correlates the third keys with bubble-film theme audios; and
in response to a touch operation of at least one key of the first, second, or third keys by a user in an input process, playing audio corresponding to the theme keyboard and matching characteristics of the input interface.

2. The method according to claim 1, wherein the input interface includes at least one of:
a blue-and-white porcelain interface;
a Mahjong interface; or
a bubble-film interface.

3. The method according to claim 1, further comprising at least one of:
in response to a click operation of a first key of the first, second, or third keys, highlighting the first key;
in response to a long press operation of a second key of the first, second, or third keys, highlighting the second key and displaying an alternative key corresponding to the second key; or in response to a slide operation of a third key of the first, second, or third keys, highlighting an alternative key corresponding to the third key.

4. The method according to claim 1, further comprising:
in response to the touch operation of the at least one of the first, second, or third keys by the user, determining a key value of the at least one of the first, second, or third keys; and
when the key value is consonant, playing the audio corresponding to the at least one of the first, second, or third keys and matching the characteristics of the input interface.

5. The method according to claim 1, wherein the input interface further includes at least one toolbar icon, the method further comprising:
upon displaying the input interface, outputting an animation effect corresponding to the toolbar icon.

6. The method according to claim 5, further comprising:
outputting a color change effect of the toolbar icon; and
outputting an alternating display effect between sub-icons corresponding to the toolbar icon.

7. The method according to claim 1, further comprising:
in response to a sharing operation of a skin corresponding to the input interface, generating a sharing link for the skin corresponding to the input interface; and
sending the sharing link to a target user corresponding to the sharing operation.

8. The input method according to claim 1, wherein the first keys include a first key and a second key and the music theme audios include classic music theme audios, the method further comprising:
playing a first classic music theme audio upon detecting activation of the first key; and
playing a second classic music theme audio different than the first classic music theme audio upon detecting activation of the second key.

9. The input method according to claim 1, wherein the first, second, or third keys include a first key and a second key separately positioned from the first key, the method further comprising:
selecting the first key to present a first popup interface;
displaying on the first popup interface, at a first timepoint, at least one first popup key along with a copy of the first key, wherein the copy of the first key is separately positioned from the first key;
selecting the second key to present a second popup interface;
displaying on the second popup interface, at a second timepoint different than the first time point, at least one second popup key along with a copy of the second key, wherein the copy of the second key is separately positioned from the second key;
playing a first audio corresponding to a selection of the at least one first popup key; and
playing second audio corresponding to the at least one second popup key, wherein the first audio is different than the second audio, and wherein both the first audio and the second audio correspond to the keyboard theme map.

10. The method according to claim 9, wherein at least one of the first and second popup interfaces is displayed above the first, second, or third keys when viewed from the user.

11. The method according to claim 9, wherein the at least one first popup key includes one or more left popup keys and one or more right popup keys, and wherein the copy of the first key is positioned between the one or more left popup keys and the one or more right popup keys.

12. A non-transitory computer-readable storage medium containing computer-executable instructions for, when executed by one or more processors, performing an input method, the method comprising:
recognizing a program environment upon detecting a user input according to an environment relationship map stored in a memory of a user device, the environment relationship map including a text editing environment, an instant messaging environment, and a gaming environment correlating to different user inputs via different input methods, wherein the different input methods are respectively embedded in the text editing environment, the instant messaging environment, and the gaming environment, and wherein the different input methods are respectively triggered upon capturing a touch operation on the user device;
displaying an input interface with a theme keyboard specific to the program environment as recognized according to keyboard theme maps stored in the memory of the user device, the keyboard theme maps including first, second, and third keyboard theme maps, wherein the input interface includes first keys, second keys, and third keys, and wherein the first keyboard theme map correlates the first keys with music theme audios, the second keyboard theme map correlates the second keys with gaming theme audios, and the third keyboard theme map correlates the third keys with bubble-film theme audios; and
in response to a touch operation of at least one key of the first, second, or third keys by a user in an input process, playing audio corresponding to the theme keyboard and matching characteristics of the input interface.

13. The non-transitory computer-readable storage medium according to claim 12, wherein the input interface includes at least one of:
a blue-and-white porcelain interface;
a Mahjong interface; or
a bubble-film interface.

14. The non-transitory computer-readable storage medium according to claim 12, further comprising:
upon a click operation of the at least one key of the first, second, or third keys, outputting an animation effect corresponding to the at least one key of the first, second, or third keys.

15. The non-transitory computer-readable storage medium according to claim 12, further comprising at least one of:
in response to a click operation of a first key of the first, second, or third keys, highlighting the first key;
in response to a long press operation of a second key of the first, second, or third keys, highlighting the second key and displaying an alternative key corresponding to the second key; or
in response to a slide operation of a third key of the first, second, or third keys, highlighting an alternative key corresponding to the third key.

* * * * *